United States Patent
Yang (10) Patent No.: US 7,093,568 B2
(45) Date of Patent: Aug. 22, 2006

(54) CONTROL OF AUTOIGNITION TIMING IN A HCCI ENGINE

(75) Inventor: Jialin Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 10/248,349

(22) Filed: Jan. 13, 2003

(65) Prior Publication Data

US 2004/0134449 A1 Jul. 15, 2004

(51) Int. Cl.
*F02B 1/12* (2006.01)

(52) U.S. Cl. .................. 123/27 R; 123/90.11

(58) Field of Classification Search .............. 123/27 R, 123/70.15, 90.11, 348
See application file for complete search history.

(56) References Cited

U.S. PATENT DOCUMENTS

| | | | |
|---|---|---|---|
| 5,329,912 A | | 7/1994 | Matsumoto et al. |
| 5,598,814 A | * | 2/1997 | Schroeder et al. ........ 123/90.11 |
| 5,765,514 A | * | 6/1998 | Sono et al. ............... 123/90.11 |
| 6,267,097 B1 | | 7/2001 | Urushihara et al. |
| 6,305,364 B1 | | 10/2001 | Ma |
| 6,311,653 B1 | * | 11/2001 | Hamamoto ............... 123/90.11 |
| 6,311,667 B1 | | 11/2001 | Satou et al. |
| 6,336,436 B1 | | 1/2002 | Miyakubo et al. |
| 6,357,403 B1 | * | 3/2002 | Yano ........................ 123/90.11 |
| 6,386,157 B1 | * | 5/2002 | Hartke et al. ............ 123/90.15 |
| 6,405,693 B1 | * | 6/2002 | Yoeda et al. ............. 123/90.15 |
| 6,405,706 B1 | * | 6/2002 | Hammoud et al. .......... 123/316 |
| 6,439,175 B1 | * | 8/2002 | Arai et al. ................ 123/90.11 |
| 6,619,242 B1 | * | 9/2003 | Kaneko ........................ 123/21 |
| 6,640,754 B1 | * | 11/2003 | Iida ............................. 123/27 R |

OTHER PUBLICATIONS

SAE 2000-01-1837; "Innovative Ultra-low NOx Controlled Auto-Ignition Combustin Process for Gasoline Engines: the 4-SPACE Project"; Jacques Lavy et al.
SAE 2000-01-2870; "Demonstration of HCCI Using a Single Cylinder Four-Stroke SI Engine with Modified Valve Timing", George Kontarakis et al.
SAE 2002-01-0110; "Cycle to Cycle Variations: Their Influence on Cycle Resolved Gas Temperature and Unburned Hydrocarbons from a Camless Gasoline Compression Ignition Engine"; Lucien Koopmans et al.
SAE 982483; "The Knocking Syndrome—Its Cure and Its Potential" Jurgen Willand et al.

(Continued)

*Primary Examiner*—Henry C. Yuen
*Assistant Examiner*—Jason Benton
(74) *Attorney, Agent, or Firm*—Diana D. Brehob; Edward J. Timmer (57) ABSTRACT

Method and system embody a valve timing strategy to control the autoignition timing of a four stroke internal combustion engine (10) operated in an HCCI mode at different engine operating conditions such as different engine speed and torque. A particular valve timing strategy varies lift timing of the intake valve (20) relative to the exhaust valve (28), or vice versa, and relative to top dead center in response to a change in engine torque, for example, to vary amount of trapped residual burned gas in the combustion chamber (12) flowing to an intake or exhaust port (16,18) and back to the combustion chamber during which the residual gas is cooled. Control of the flow of residual gas between the combustion chamber and intake or exhaust port and thus its temperature by the valve timing strategy, in turn, is used to control the temperature of the fresh air/residual gas/fuel mixture in the combustion chamber (12) and thus autoignition timing in response to a change in engine torque.

20 Claims, 4 Drawing Sheets

OTHER PUBLICATIONS

SAE 2001-01-3601; "A Four Stroke Camless Engine, Operated in Homogeneous Charge Compression Ignition Mode with Commercial Gasoline"; Lucien Koopmans et al.

SAE 2000-01-0251; "Controlled Combustion in an IC-Engine with a Fully Variable Valve Train"; Don Law et al.

SAE 2001-01-3608; "Research and Development of Controlled Auto-Ignition (CAI) Combustion in a 4-Stroke Multi-Cylinder Gasoline Engine"; Jian Li et al.

SAE 2002-01-0420; "Performance and Analysis of a 4-Stroke Multi-Cylinder Gasoline Engine with CAI Combustion"; Hua Zhao et al.

SAE 2002-01-0422; "Variable Valve Actuated Controlled Auto-Ignition: Speed Load Maps and Strategic Regimes of Operation"; Jeff Allen et al.

* cited by examiner

CONTROL OF AUTOIGNITION TIMING IN A HCCI ENGINE

CROSS-REFERENCE TO RELATED APPLICATIONS:

This application is a continuation of U.S. Patent Application Ser. No. 10/248,349, filed Jan. 13, 2003. As such, the present application claims priority to an original filing date of Jan. 13, 2003. The original patent application is herein incorporated by reference in its entirety for all purposes.

BACKGROUND OF INVENTION

1. Field of the Invention

This invention relates to methods and systems for controlling autoignition timing of an internal combustion engine operated in a homogeneous-charge compression-ignition mode.

2. Background Information

A conventional gasoline-fueled internal combustion engine employs spark ignition where the fuel and air are premixed and a spark initiates a flame that propagates through the fuel/air mixture in the combustion chamber. The other common type of internal combustion engine employs compression ignition where the fuel and air are purposely kept separate until shortly before top dead center in the engine when the temperature of the air in the combustion chamber is high due to the compression. The fuel then is quickly injected into the combustion chamber as a very fine mist, which partially mixes with the air and autoignites in the combustion chamber. The timing of the fuel injection timing thus controls the autoignition timing. Diesel engines are illustrative of this type of compression ignition engine.

Homogeneous-charge compression-ignition (HCCI) internal combustion engines are known and offer the potential to reduce fuel consumption and $NO_x$ emissions. An HCCI engine employs a premixed fuel/air charge to the combustion chamber as in a spark ignition engine, while the charge is ignited by compression ignition as in a diesel engine when the temperature of the air-fuel charge reaches an autoignition temperature in the combustion chamber. HCCI engines typically are provided with a conventional spark plug for each cylinder and relatively low compression ratios, typically close to those of spark ignition (SI) engines, to permit switching of operation of the engine from the HCCI mode at lower engine torques to the SI mode at higher engine torques without engine knocking.

Control of autoignition timing in an HCCI engine is more difficult than in a diesel engine, which controls fuel injection timing to control autoignition timing. In an HCCI engine, the composition and temperature of the fuel/gas mixture in the combustion chamber must be controlled to control autoignition timing.

It has been proposed to control HCCI autoignition timing using what has been called a negative valve overlap strategy that provides internal exhaust gas recirculation in the combustion chamber. Negative valve overlap control strategy involves trapping hot residual burned gas in the cylinder to subsequently mix with fresh air inducted into the combustion chamber. The trapped burned gas raises the temperature of the air-burned gas mixture to promote autoignition. Autoignition timing (delay) is represented by the equation: $t = A \exp(E/RT)$, where $t$ is the time it takes for the mixture in the combustion chamber to autoignite, often called the ignition delay, $A$ is an empirical constant, $E$ is an activation energy and is a function of the composition of the mixture, such as type of fuel, fuel/air mixture, amount of residuals, etc., and $R$ is the universal gas constant. Because the equation expresses an exponential relationship, it is evident that temperature of the mixture plays a key role in determining if and importantly when autoignition will occur.

Figure 5:
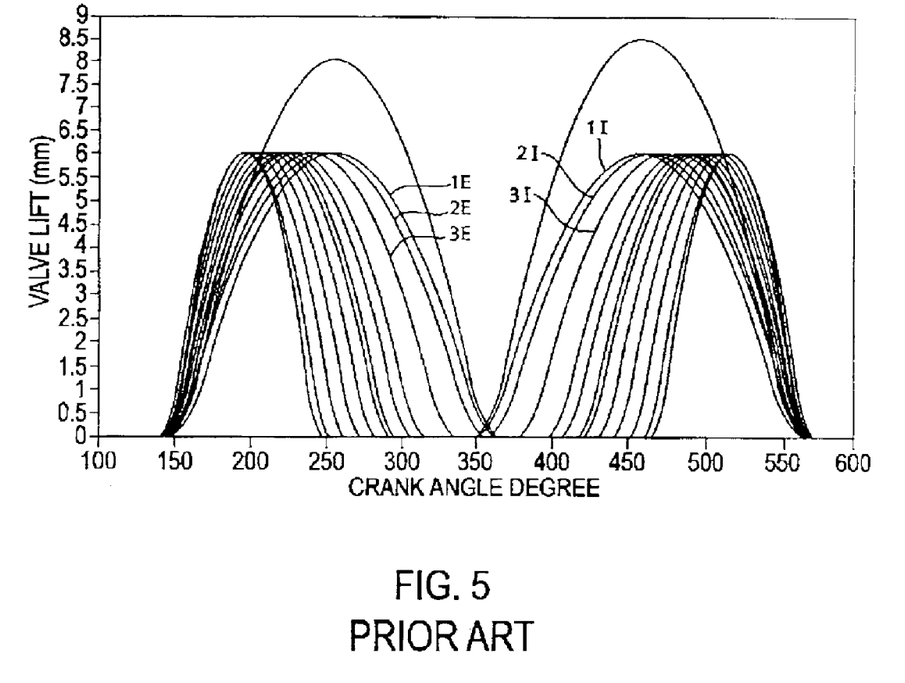

Pursuant to negative valve overlap control strategy, the exhaust valve closes before top dead center (TDC) and the intake valve opens after TDC such that both valves are closed at TDC of the exhaust stroke. Such strategy controls trapping of hot residual burned gas in the combustion chamber to, in turn, control the autoignition timing. FIG. 5 shows a plurality of intake and exhaust valve lift curves versus crank angle for an HCCI engine for purposes of illustrating the negative valve overlap strategy where different negative valve overlaps are shown for use at different engine torques. In particular, for different engine torques, different pairs of intake and exhaust valve lift curves (e.g., curves 1I, 1E; 2I, 2E; 3I, 3E; and so on) are employed in coordination with one another to provide the desired negative overlap for a particular engine torque. That is, intake and exhaust valve lift curves 1I, 1E would be used in coordination for a particular engine torque, different intake and exhaust valve lift curves 2I, 2E would be used in coordination for a different particular engine torque, and so on. The negative valve overlap control strategy is described by Willard et al. in "The knocking syndrome—its cure and its potential", SAE 982483, 1998.

When engine speed or torque changes, the autoignition timing of the HCCI engine tends to change. For example, at higher torque, autoignition timing tends to advance, resulting in the increase in heat transfer losses, $NO_x$ emissions, and combustion noise. Therefore, the engine control system should adjust to move the autoignition timing back to the optimum crank angle. At lower engine torque, autoignition timing tends to be retarded, resulting in an increase of CO emissions and lower combustion efficiency. The engine control system should adjust to move the autoignition timing back to the optimum crank angle.

Moreover, it is desirable to operate the engine with a stoichiometric air-fuel mixture and with a conventional three-way catalyst for after-treatment of exhaust gases. Control of the mass of trapped hot residual burned gas in the cylinder can provide control of autoignition timing during HCCI engine operation. There is a need to also control air-fuel ratio to provide a stoichiometric mixture for engine operation over a wide range of climate and weather conditions without altering the autoignition timing.

However, use of negative valve overlap as a single control variable in HCCI engine control strategy to control both the autoignition timing and the air-fuel ratio at different operating conditions is problematic in that use of a single negative valve overlap variable in the control strategy offers insufficient degrees of freedom to control the air-fuel ratio, in-cylinder gas temperature, and residual fraction of burned gas in the in-cylinder gas in a manner to provide favorable values for all of these parameters at different operating conditions.

SUMMARY OF INVENTION

The present invention provides a method and system embodying a particular valve timing strategy to control the autoignition timing of a four stroke internal combustion engine operated in the HCCI mode at different engine operating conditions such as at different operator (driver) demanded engine torques. A particular valve timing strategy varies lift timing of the intake valve relative to the exhaust valve, or vice versa, and relative to top dead center in response to a change in operator demanded engine torque, for example, to vary amount of trapped residual burned gas in the combustion chamber flowing to an intake or exhaust port and back to the combustion chamber by which the residual gas loses thermal energy and is cooled. Such control of the flow of residual burned gas between the combustion chamber and intake or exhaust port and thus its temperature by the valve timing strategy is used to control the temperature of the fresh air/residual burned gas mixture in the combustion chamber into which fuel is mixed and thus the autoignition timing to suit a given engine torque demand.

In an illustrative embodiment of the invention, the exhaust valve timing is substantially fixed before TDC over successive engine cycles to control the air-fuel ratio in the combustion chamber. The opening time of the intake valve is varied relative to TDC (e.g., advanced toward TDC) over successive intake cycles in a manner that changes the temperature of the fresh air/residual burned gas mixture in the combustion chamber into which the fuel is mixed and thus the autoignition timing. The exhaust valve timing and/or the fuel injection pulse width can be adjusted slightly to compensate for the effect of the temperature change of the mixture on the mass of the inducted fresh air in the combustion chamber. Further, for each intake event, an initial intake valve opening event preferably is provided immediately after the exhaust valve closes and before TDC followed by a main intake valve event occurring after TDC in a manner to reduce or minimize engine pumping losses.

In another illustrative embodiment of the invention, the intake valve lift timing is substantially fixed after TDC over successive engine cycles to control the air-fuel ratio in the combustion chamber. The closing time of the exhaust valve is varied relative to TDC (e.g., retarded toward TDC) over successive exhaust cycles in a manner that changes the temperature of the fresh air/residual burned gas mixture in the combustion chamber into which fuel is mixed and thus the autoignition timing. The intake valve timing and/or the fuel injection pulse width can be adjusted as needed in order to compensate for the effect of the temperature change of the mixture on the mass of the inducted fresh air in the combustion chamber. For each exhaust event, a first main exhaust valve opening event preferably is provided before TDC followed by a subsequent secondary exhaust valve event occurring after TDC immediately before opening of the intake valve in a manner to reduce or minimize engine pumping losses.

The above advantages of the present invention will become more readily apparent from the following description taken with the following drawings.

BRIEF DESCRIPTION OF DRAWINGS

FIG. 5 is a diagram illustrating conventional coordinated intake and exhaust valve lift curves versus crank angle (where BDC is bottom dead center and TDC is top dead center) of an HCCI engine at different engine torques to provide different negative valve overlaps wherein intake and exhaust lift curves 1I, 1E are employed at a given torque; curves 2I, 2E are employed at a different torque; and so on.

DESCRIPTION OF THE INVENTION

Figure 1:
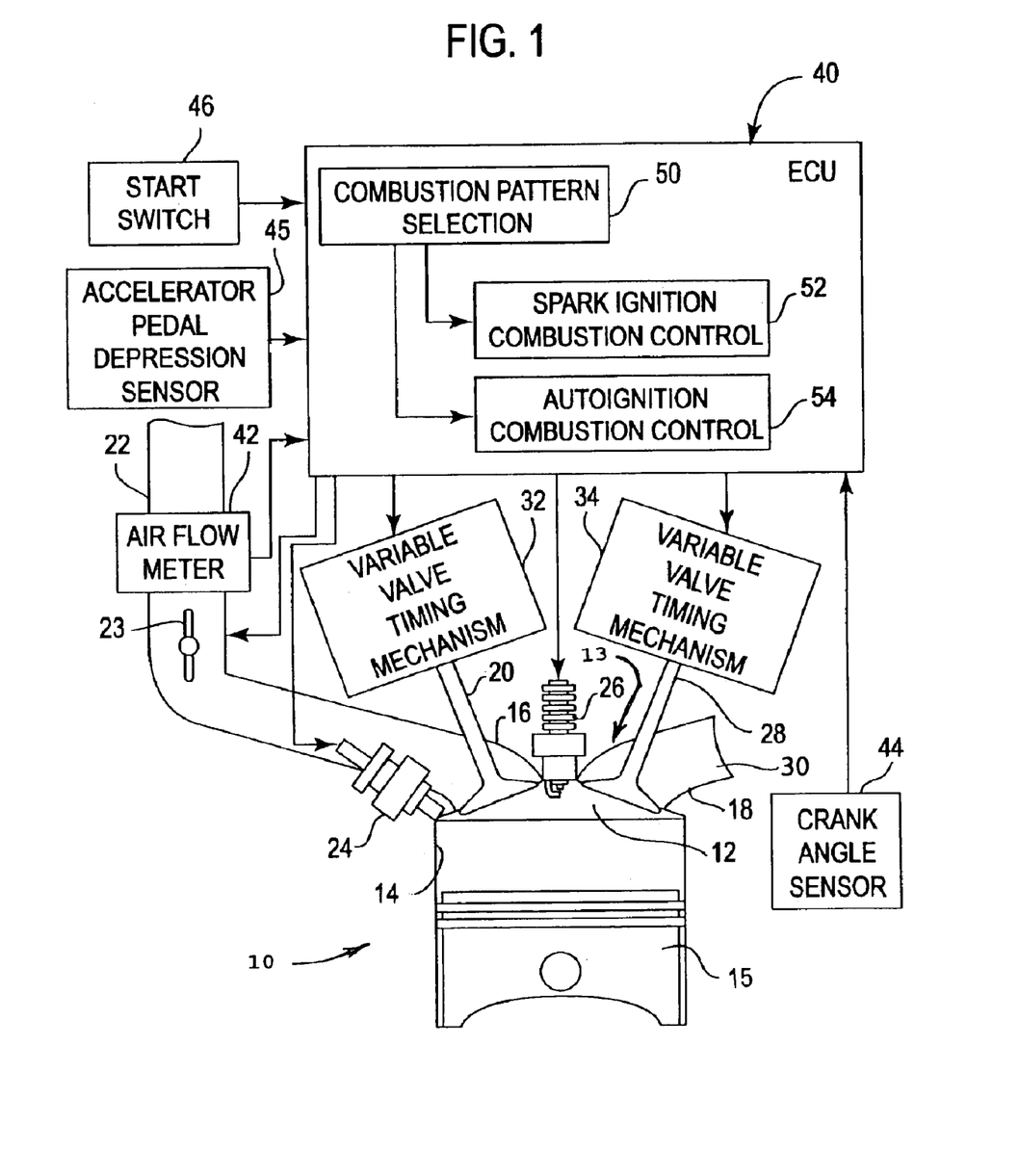
FIG. 1 is a schematic view of an internal combustion engine and an electronic engine control unit for practicing an embodiment of the invention.

Referring to FIG. 1, a four cycle internal combustion engine 10 is illustrated as comprising a combustion chamber 12 formed by a conventional cylinder head 13, cylinder 14, and piston 15. The combustion chamber 12 is expanded and contracted by the piston 15 reciprocating in the engine cylinder 14. An intake port 16 and exhaust port 18 of the engine 10 communicate with the combustion chamber 12 in conventional manner. An intake valve 20 is provided in the intake port 16. An intake passage 22 of the engine communicates with the intake port 16. Air is aspirated from the intake passage 22 through the intake port 16 into the combustion chamber 12 when the intake valve 20 is open due to the piston descending in the cylinder. A throttle 23 is provided in intake passage 22 for adjusting the intake air flow rate of the engine in a spark ignition (SI) mode. In HCCI mode, the throttle 23 is preferably fully open as shown in FIG. 1. A conventional fuel injector 24 and spark plug 26 are provided on the cylinder head so as to communicate with the combustion chamber 12. Fuel injected into the combustion chamber 12 by fuel injector 24 is mixed with fresh air aspirated from the intake port 16 and some fraction of residual burned gas in the SI mode of engine operation. In the HCCI mode, fuel injected into the combustion chamber 12 is mixed with a fresh air-residual burned gas mixture having a much higher fraction of residual burned gas for subsequent compression in combustion chamber 12 by the piston 15. Alternately, the fuel injector 24 can be mounted in the intake port in the same manner as a port-fuel-injection engine.

An exhaust valve 28 is provided in the exhaust port 18. Burned gas is discharged from the exhaust port 18 through an exhaust passage 30 when the exhaust valve 28 is open during the exhaust stroke.

Variable valve timing mechanisms 32, 34 are provided on the engine to change the open/close timing of the intake valve 20 and exhaust valve 28, respectively. The variable valve timing mechanisms 32, 34 each can comprise a plural cam-type mechanism, a solenoid-actuated mechanism, and other valve timing mechanisms known in the art for adjusting the open/close timing of intake and exhaust valves of internal combustion engines. U.S. Pat. No. 6,295,964 describes a particular variable valve timing mechanism for an internal combustion engine.

Although only one combustion chamber 12 and cylinder 14 with piston 15 therein are shown in FIG. 1, those skilled in the art will appreciate that the engine 10 typically will include other similar combustion chambers/cylinders/pistons and associated intake valves, exhaust valves, fuel injectors, and spark plugs as shown in FIG. 1. Further, more than one intake valve 20 and more than one exhaust valve 28 can be provided for each combustion chamber 12. In addition, although the fuel injector 24 is illustrated as injecting fuel directly into cylinder 15, the invention alternately can be practiced using fuel injection into the intake port 16.

An electronic control unit (ECU) 40 is provided to control the fuel injection amount and injection timing, the spark timing of the spark plug 26, the opening of throttle 23, the open/close timing of the intake valve 20 and exhaust valve 28 by variable valve timing mechanisms 32, 34. The ECU 40 comprises a microcomputer including a central processing unit, read-only memory, a random access memory, and a keep-alive memory, which retains information when the engine ignition key is turned-off for use when the engine is restarted, and an input/output interface. The ECU 40 can be embodied by an electronically programmable microprocessor, a microcontroller, an application-specific integrated circuit, or a like device to provide a predetermined engine control logic.

The ECU 40 receives a plurality of signals from the engine 10 via the input/output interface. Such signals can include, but are not limited to, signals from an air flow meter 42 which detects intake air flow rate in the intake passage 22, a crank angle sensor 44 which detects crank angle of the engine 10, an accelerator pedal depression sensor 45 which detects the amount of depression of the accelerator pedal, and a starter switch 46 which detects start-up of the engine 10.

The ECU 40 processes these signals received from the engine sensors and generates corresponding signals, such as a fuel injector pulse waveform signal that is transmitted to each fuel injector 24 of each cylinder 15 on a signal line to control the amount and timing of fuel delivered by each fuel injector 24 to combustion chamber 12. ECU 40 provides corresponding signals to control the spark timing of each spark plug 26, the opening of throttle 23, and the open/close timing of each intake valve 20 and exhaust valve 28 by each variable valve timing mechanisms 32, 34.

Referring to FIG. 1, the ECU 40 includes a combustion pattern selecting section 50 implemented by a software program or programs for selecting a particular combustion mode; namely, a spark ignition mode 52 or a HCCI (compression autoignition) mode 54, depending on engine operating conditions. For example, ECU 40 can select a combustion mode based on an engine speed signal from crank angle sensor 44 and on an accelerator pedal position (indicative of a operator demand for engine torque) signal from accelerator pedal depression sensor 45. ECU 40 typically selects the compression autoignition engine operating mode 54 in a predetermined engine operating region characterized by relatively low engine speed and low to medium engine torque, and selects the spark ignition mode in a very low engine torque region and in a region of high engine speed and/or high engine torque. When the compression autoignition mode 54 is selected, ECU 40 can deactivate the spark plug 26 or alternatively continue sparking of the spark plug 26.

The present invention provides a method and system using a particular valve lift timing strategy to control the autoignition timing and the air-fuel ratio during engine operation in the HCCI mode 54. A particular valve timing strategy pursuant to the present invention controls lift timing of one of the intake valve relative to the exhaust valve, or vice versa, and relative to top dead center to control autoignition timing at a given fixed engine speed and operator demanded engine torque. The air-fuel ratio also is controlled at the given fixed engine speed and torque. As is known, the piston 15 generates maximum compression of gases in combustion chamber 12 at TDC, the top of its stroke. Before TDC, the piston 15 moves toward combustion chamber 12, and, after TDC, the piston 15 is moving away from the combustion chamber 12.

Figure 2:
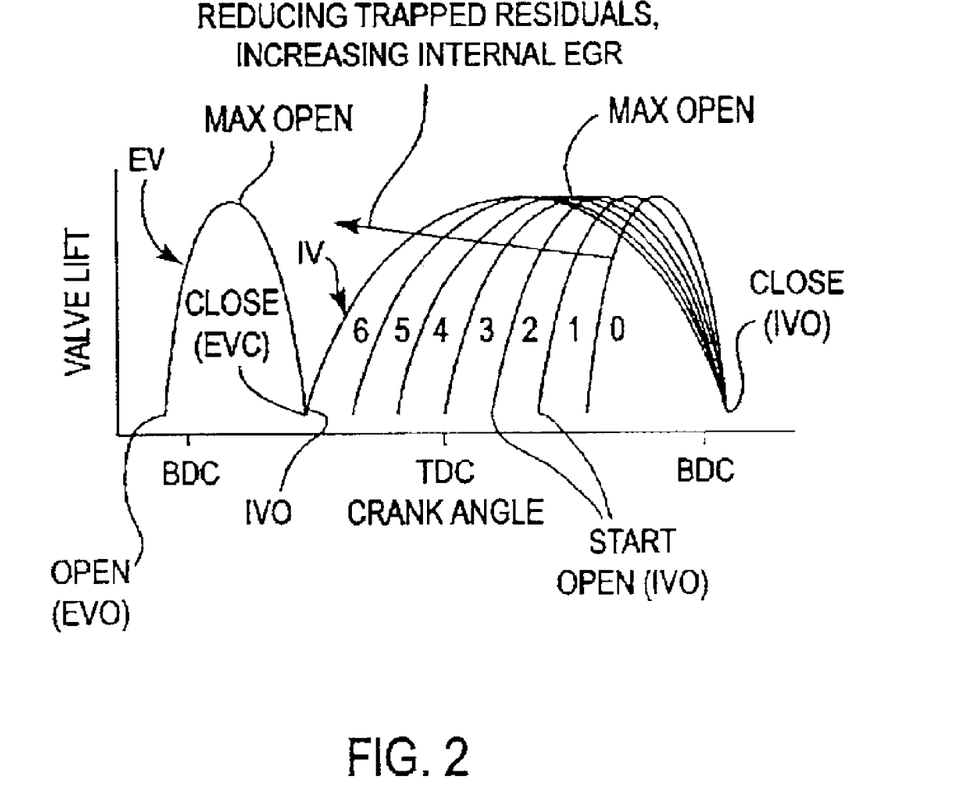
FIG. 2 is diagram illustrating intake and exhaust valve lift curves versus crank angle (where BDC is bottom dead center and TDC is top dead center) at a given engine speed and torque for an embodiment pursuant to the invention.

FIG. 2 shows an illustrative embodiment of the present invention where the air-fuel ratio is controlled by controlling the mass of trapped r combustion chamber 12 that mixes with inducted fresh air at the time before the compression stroke of engine 10 when the engine is operated at a fixed geometric compression ratio (e.g., in the range of 10:1 to 15:1). In FIG. 2, the exhaust valve lift (represented by curve EV) from its opening time EVO to its closing time EVC is plotted versus crank angle of the engine 10. As shown, the exhaust valve opening and closing times under fixed operating conditions of engine speed and torque are substantially fixed or constant relative to TDC for each exhaust stroke. With fixed exhaust valve opening time and closing time, the amount of residual burned gas that does not flow into the exhaust port 18 is, in turn, fixed regardless of the intake valve timing. Thus, at a fixed intake (in-cylinder) pressure, the mass of fresh intake air inducted into the combustion chamber 12 is substantially fixed such that the air-fuel ratio can be controlled. At a given engine speed, the exhaust valve timing is used to control air-fuel ratio in combustion chamber 12, which in turn provides the operator (driver) demanded engine torque. As used above, substantially fixed fresh air mass means that there is at most a minor change in the mass of fresh air inducted into the combustion chamber 12 as a result of the temperature change of the burned gas with which the air is mixed in the combustion chamber 12 as described below. This minor change in fresh air mass can be accommodated as also described below.

FIG. 2 illustrates varying (e.g., advancing) intake valve opening (IVO) of the intake valve 20 after the exhaust valve 28 closes as indicated by valve lift curves 1, 2, 3, 4, 5, 6 over successive intake events. Such varying (e.g., advancement) of intake valve opening time gradually changes (e.g., reduces) the temperature of the fresh air-residual burned gas mixture into which fuel is mixed in the combustion chamber 12 and thus the autoignition timing before compression. The autoignition timing can be changed in response to changes in operator demanded engine torque using such valve timing. Intake valve lift curves IV, numbered 1 through 6, illustrate intake valve lifts from IVO to intake valve closing IVC time of this embodiment of the invention. Curve EV together with curve 0 represent a negative valve overlap condition where none of the trapped residual burned gas flows out of the combustion chamber 12 such that the air/residual burned gas mixture will have the highest mixture temperature at a time before the compression.

In effect, varying (e.g., advancing) of the time of opening of the intake valve 20 as indicated by valve lift curves 1, 2, 3, 4, 5, 6 over successive intake events gradually increases the intake time period so as to permit more and more trapped residual burned gas to be pushed out or from the combustion chamber 12 into the intake port 16 after the exhaust valve 28 closes and then to flow back to the combustion chamber when the intake valve opens and the piston descends. That is, a greater and greater portion of the original hot trapped residual burned gas is caused to flow (by higher cylinder pressure generated by compression in the exhaust stroke after the exhaust valve closes) into the intake port 16 as permitted by advanced opening of intake valve 20 and then drawn by the intake stroke from the intake port 16 back into the combustion chamber 12. Transmission of the residual burned gas between the combustion chamber and the intake port in this manner reduces thermal energy of the residual burned gas by heat transfer to adjacent intake port walls without reducing the mass of the residual burned gas in the combustion chamber 12. Such transmission is effective to control the mass ratio of original hot trapped residual burned gas to the cooler recycled burned gas so as to gradually decrease (or increase) the temperature of the fresh air/ residual burned gas mixture into which fuel is mixed in the combustion chamber before compression. Autoignition timing thereby can be controllably changed by gradually changing the intake valve opening time over successive engine cycles (one engine cycle equals four strokes or two revolutions) relative to exhaust valve timing in response to changes in operator demanded engine torque. Typically, autoignition timing is controlled to occur near TDC such as, for example, the time of 50% completion of combustion occurs within a range of 5 to 10 degrees after TDC.

When the temperature of the residual burned gas in the combustion chamber 12 is changed, the mass of the fresh intake air inducted into the combustion chamber and mixed with the residual burned gas mixture will also be accordingly changed by a minor amount despite the intake (in-cylinder) pressure and geometric compression ratio of the engine remaining unchanged. The invention envisions ECU 40 slightly adjusting the exhaust valve closing time and/or the fuel injection pulse width during the period that the intake valve opening timing is being changed as may be needed in order to compensate for this effect of temperature change of the residual burned gas mixture on the mass of the fresh air inducted into the combustion chamber 12. For example, ECU 40 can move the exhaust valve closing time closer to TDC during the period when the intake valve opening timing is changed to increase the amount of hot trapped residual burned gas exhausted from the combustion chamber 12 and thereby increase the mass of inducted fresh air.

According to this embodiment of the invention, at any fixed engine speed, the air-fuel ratio in combustion chamber 12 can be controlled to the stoichiometric proportion by ECU 40 determining engine torque and controlling the exhaust valve opening time and closing time as described above in response to the determined engine torque. The autoignition timing is adjusted by ECU 40 by gradually changing the intake valve opening time as illustrated, for example, in FIG. 2 by curves 1 through 6 over successive intake events.

Figure 3:
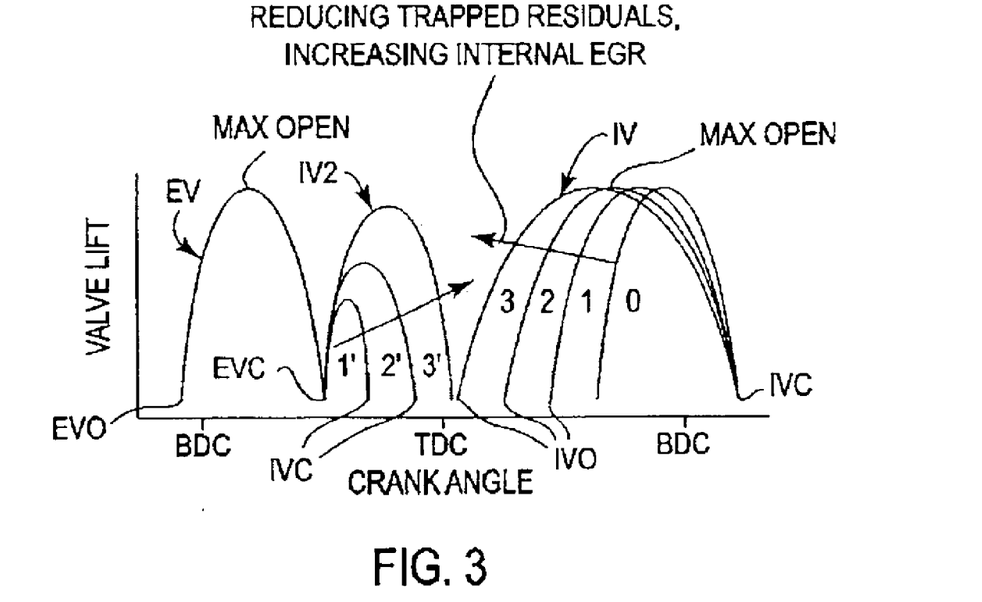
FIG. 3 is diagram illustrating intake and exhaust valve lift curves versus crank angle at a given engine speed and torque for another embodiment pursuant to the invention having double intake valve events.

FIG. 3 illustrates another similar valve timing strategy that minimizes or eliminates engine pumping losses while controlling autoignition timing and air-fuel ratio.

The valve timing strategy of FIG. 3 is similar to that of FIG. 2 with, however, the inclusion of an additional initial intake event IV2 before TDC. Similar to FIG. 2, at a fixed engine speed, the air-fuel ratio in combustion chamber 12 can be controlled to the stoichiometric proportion by ECU 40 determining engine torque and controlling the exhaust valve timing as described above in response to the demanded engine torque. Control of autoignition is achieved by advancing the intake valve opening time IVO as illustrated by curves 1, 2, 3 in FIG. 3 relative to TDC. To avoid engine pumping losses, the additional intake event IV2 is provided immediately after the exhaust valve 28 closes in the exhaust stroke as shown in FIG. 3 to allow some residual burned gas to be pushed into the intake port 16 due to continued upward movement of the piston 14 in the exhaust stroke. The intake valve closing time IVC of the intake event IV2 occurring before TDC is varied depending on the amount of advancement of the intake opening time of main intake event IV occurring after TDC. That is, curve 1' of the additional intake event would be employed when curve 1 represents the main intake event occurring after TDC, curve 2' of the additional intake event would be employed when curve 2 represents the main intake event occurring after TDC, and so on. As is apparent from FIG. 3, the crank angle from the end of the additional, initial intake event IV2 (curve 1', 2', or 3') to TDC and the crank angle from TDC to the beginning of the subsequent main intake event (curve 1, 2, or 3) should be essentially equal to minimize engine pumping losses.

In the embodiments of FIGS. 2 and 3, the fuel injection timing is controlled by ECU 40 to occur typically after TDC since after TDC, the gases flow into the combustion chamber due to the downward movement of the piston. If an engine uses in-cylinder (direct) fuel injection, the fuel injection timing as controlled by ECU 40 can play a role in control of the mixture temperature, hence the autoignition timing, due to the charge cooling effect of fuel evaporation. In general, later fuel injection results in lower mixture temperature before compression. That is, the charge before fuel injection (i.e., without charge cooling by fuel evaporation) is hotter, increasing heat transfer from the hot burned gas to the port walls. The fuel injection timing is constrained by the requirement of fuel-air mixing. Fuel droplets need time to vaporize and mix with the air.

Figure 4:
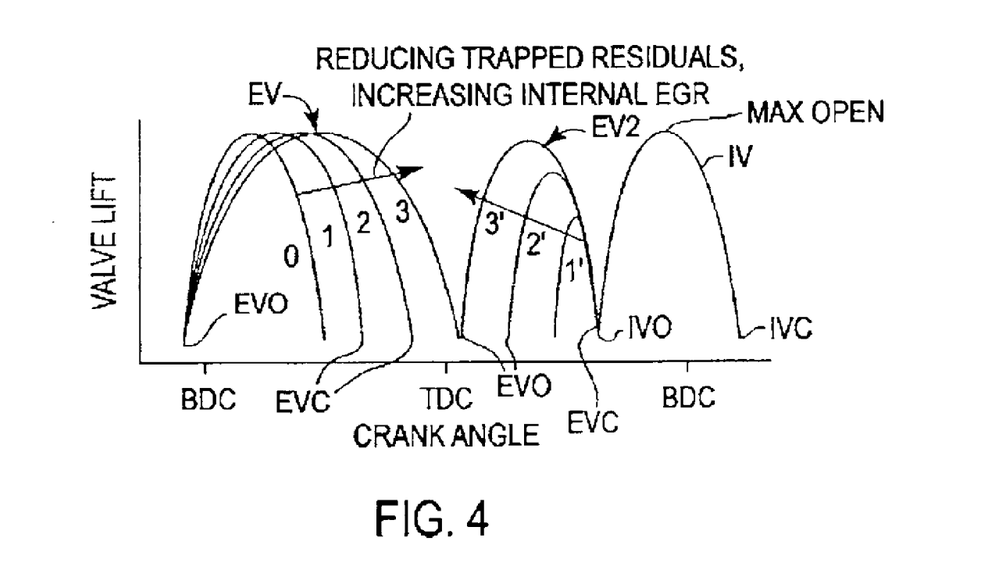
FIG. 4 is diagram illustrating intake and exhaust valve lift curves versus crank angle at a given engine speed and torque for another embodiment pursuant to the invention having double exhaust valve events.

FIG. 4 illustrates another embodiment of the invention where the intake valve opening time IVO is controlled in a manner to control the air-fuel ratio in combustion chamber 12 and the closing time EVC of the exhaust valve 28 is varied relative to TDC (e.g., retarded toward TDC) over successive exhaust cycles in a manner that changes the temperature of the air/residual burned gas mixture into which fuel is mixed in the combustion chamber 12 and thus the autoignition timing.

For example, FIG. 4 illustrates an embodiment of the present invention where the intake air mass is controlled by the intake valve opening time and closing time so long as in-cylinder pressure at the time of intake valve opening is fixed. As shown, the intake valve opening and closing times IVO, IVC under fixed operating conditions of engine speed and torque are substantially fixed or constant relative to TDC for each intake stroke. At a fixed engine speed, the air-fuel ratio in combustion chamber 12 can be controlled to the stoichiometric proportion by ECU 40 determining engine torque and controlling the intake valve opening time in response to the determined engine torque.

The exhaust valve lift timing is used to control the temperature of the fresh air-residual burned gas mixture in the combustion chamber 12 and thus the autoignition temperature before compression. When the exhaust valve closing times are retarded over successive exhaust strokes relative to TDC as represented by curves 1, 2, 3 of the initial exhaust event EV of FIG. 4, more and more hot trapped residual burned gas can flow out of the combustion chamber 12 into the exhaust port 18 and then flow back into the combustion chamber during the subsequent second exhaust event EV2 occurring after TDC represented by curves 1', 2', 3' to reduce thermal energy by heat transfer and thereby control the temperature of the burned gas mixture in the cylinder. The mass of the residual burned gas that mixes with fresh air inducted into combustion chamber 12 remains essentially unchanged despite the changes of exhaust valve closing timing. The second exhaust event EV2 ends at the time when the intake valve 20 opens so as to control the in-cylinder pressure at the time of intake valve opening. This enables control of the intake air mass by the timing of the intake valve opening as described above for air-fuel ratio control purposes.

In the embodiment of FIG. 4, the fuel injection timing is controlled by ECU 40 typically to occur after TDC since after TDC, the gases flow into the combustion chamber due to the downward movement of the piston. Therefore, the injected fuel after TDC will not flow out of the combustion chamber to the exhaust port despite the exhaust port being open. The injection timing can be adjusted by ECU 40 to affect the mixture temperature as described above for in-cylinder (direct) fuel injection.

When the temperature of the residual burned gas in the combustion chamber 12 is changed, the mass of the fresh intake air inducted into the combustion chamber and mixed with the burned gas mixture will also be accordingly changed by a minor amount despite the intake (in-cylinder) pressure and effective compression ratio of the engine remaining unchanged. The invention envisions ECU 40 slightly adjusting the intake valve opening time and/or the fuel injection pulse width during the period when the exhaust valve closing timing is changed as may be needed in order to compensate for this effect of temperature change of the burned gas mixture on the mass of the fresh air inducted into the combustion chamber 12. For example, ECU 40 can move the intake valve opening time closer to TDC during the period of changing of the exhaust valve closing timing to increase the mass of fresh air inducted into the combustion chamber 12.

To avoid engine pumping losses, the additional exhaust event EV2 is provided immediately after the exhaust valve 28 closes in the exhaust stroke and after TDC as shown in FIG. 4 to allow some residual burned gases to be drawn from the exhaust port 18 by piston motion. The exhaust valve opening time EVO of the second exhaust event IV2 occurring after TDC is varied depending on the amount of advancement of the exhaust valve closing time EVC of main intake event EV occurring before TDC. That is, curve 1' of the additional exhaust event would be used when curve 1 represents the main intake event occurring after TDC, curve 2' of the additional intake event would be used when curve 2 represents the main intake event occurring after TDC, and so on. As is apparent from FIG. 4, the crank angle from the end of the initial main exhaust event EV (curves 1, 2, 3) to TDC and the crank angle from TDC to the beginning of the subsequent exhaust event EV2 (curves 1', 2', 3') should be essentially equal to minimize engine pumping losses.

According to this embodiment of the invention, at any fixed engine speed, the air-fuel ratio in combustion chamber 12 can be controlled to the stoichiometric proportion by ECU 40 determining engine torque and controlling the intake valve open/close timing as described above in response to the determined engine torque. The autoignition timing is adjusted by ECU 40 by changing the exhaust valve closing timing as illustrated, for example, in FIG. 4 by curves 1 through 3 over successive exhaust events.

Although the invention has been described above with respect to FIG. 1 for controlling the intake valve 20 and the exhaust valve 28, those skilled in the art will appreciate that more than one intake valve (e.g., two intake valves) and more than one exhaust valve (e.g., two exhaust valves) can be controlled in a manner to achieve advantages of the invention. For example, for an engine with more than two valves per cylinder, the open/close timing of the intake valves or the exhaust valves of a cylinder can be controlled either in unison or differently. For example, FIG. 3 shows two intake events per cycle. For an engine with four valves per cylinder, the two intake valves can open and close differently such that the initial intake event IV2 is realized by one intake valve and the main intake event IV is realized by the other intake valve. Likewise, the two exhaust valves can be controlled to open and close differently when there are two exhaust events as shown in FIG. 4 such that the main exhaust EV is realized by one exhaust valve and the subsequent exhaust event EV2 is realized by the other exhaust valve.

While the invention has been described in terms of specific embodiments thereof, it is not intended to be limited thereto but rather only as set forth in the appended claims.

I claim:

1. A method for controlling a four stroke internal combustion engine operating in a homogenous charge compression autoignition mode and having an intake valve at an intake port, an exhaust valve coupled at an exhaust port, and combustion chamber, comprising:

adjusting opening time of said intake valve relative to top dead center, independent of exhaust valve closing time substantially fixed before top dead center, in an initial intake event occurring before top dead center and in a subsequent intake event occurring after top dead center after each initial intake event over successive engine cycles to change autoignition timing in response to a change in operator demanded engine torque, wherein crank angle from an end of said initial intake event to top dead center and the crank angle from top dead center to the beginning of said subsequent intake event are generally equal to reduce engine pumping losses.

2. The method of claim 1 wherein including adjusting closing time of said exhaust valve during a period of time when said open time of said intake valve is adjusted so as to change the mass of fresh air inducted into said combustion chamber.

3. The method of claim 1 including adjusting said exhaust valve at a given operator demanded engine torque relative to top dead center to control air-fuel ratio in the combustion chamber.

4. A method for controlling a four stroke internal combustion engine operating in a homogenous charge compression autoignition mode and having an intake valve at an intake port, an exhaust valve at an exhaust port, and combustion chamber, comprising:

adjusting said exhaust valve relative to said intake valve to vary exhaust valve closing time before top dead center, independent of intake valve opening time after top dead center, over successive engine cycles to change autoignition timing in response to a change in operator demanded engine torque.

5. The method of claim 4 wherein said opening time of said intake valve is substantially fixed after top dead center, and the exhaust valve closing time is varied before top dead center over successive engine cycles to provide successive exhaust events that change autoignition timing.

6. The method of claim 4 including providing a second exhaust event occurring after top dead center that is subsequent to each exhaust event occurring before top dead center wherein the crank angle from the end of said exhaust event to top dead center and the crank angle from top dead center to the beginning of the said second exhaust event are generally equal to reduce engine pumping losses.

7. The method of claim 4 including adjusting opening time of said intake valve during a period of time when said exhaust valve closing time is varied so as to change the mass of fresh air inducted into said combustion chamber.

8. The method of claim 4 including controlling said intake valve at a given operator demanded engine torque relative to top dead center to control air-fuel ratio in the combustion chamber.

9. A system for controlling a four cycle internal combustion engine operating in a homogenous charge compression autoignition mode and having an intake valve, an exhaust valve and combustion chamber, comprising:

a first variable valve timing mechanism for controlling opening time and closing time of said exhaust valve, said mechanism providing a closing time of said exhaust valve before top dead center, and a second variable valve timing mechanism for controlling opening time and closing time of said intake valve, independent of exhaust valve closing time before top dead center, to vary intake valve opening time relative to top dead center over successive engine cycles to control autoignition timing in response to a change in operator demanded engine torque.

10. The system of claim 9 including control logic operative to determine engine torque and to control said second variable valve timing mechanism to control autoignition timing in response to a change in operator demanded engine torque.

11. The system of claim 9 wherein said first variable valve timing mechanism controls said opening time and closing time of said exhaust valve to be substantially fixed before top dead center, and said second variable valve timing mechanism varies the opening time of said intake valve after top dead center over successive engine cycles to provide successive intake events that change autoignition timing.

12. The system of claim 11 wherein said second variable valve timing mechanism provides a second intake event occurring before top dead center that precedes each intake event occurring after top dead center wherein the crank angle from an end of said second intake event to top dead center and the crank angle from top dead center to the beginning of said intake event are generally equal to reduce engine pumping losses.

13. A system for controlling a four cycle internal combustion engine operating in a homogenous charge compression autoignition mode and having an intake valve, an exhaust valve and combustion chamber, comprising:

a first variable valve timing mechanism for controlling opening and closing time before top dead center, independent of intake valve opening time after top dead center, over successive engine cycles to control autoignition timing in response to a change in operator demanded engine torque, and a second variable valve timing mechanism for controlling opening and closing time of said intake valve after top dead center.

14. The system of claim 13 including control logic operative to determine engine torque and to control said first variable valve timing mechanism to change autoignition timing in response to a change in operator demanded engine torque.

15. The system of claim 13 wherein said second variable valve timing mechanism controls said opening and closing time of said intake valve to be substantially fixed after top dead center, and said first variable variable valve timing mechanism varies the closing time of said exhaust valve before top dead center over successive engine cycles to provide successive exhaust events that change autoignition timing.

16. The system of claim 13 wherein said first variable valve timing mechanism provides a second exhaust event occurring after top dead center that follows each exhaust even occurring before top dead center wherein the crank angle from a beginning of said second exhaust event to top dead center and the crank angle from the beginning of said exhaust event to top dead center are generally equal to reduce engine pumping losses.

17. The system of claim 16 wherein said second variable valve timing mechanism adjusts opening time of said intake valve during a period of time when said closing time of said exhaust valve is varied so as to change the mass of fresh air inducted into said combustion chamber.

18. A method for controlling a four stroke internal combustion engine operating in a homogenous charge compression autoignition mode and having an intake valve at an intake port, an exhaust valve at an exhaust port, and combustion chamber, comprising:

adjusting opening time of said intake valve relatie to top dead center and to said exhaust valve after said exhaust valve is closed before top dead center in an exhaust stroke, said adjusting occurring in an initial intake event occurring before top dead center and in a subsequent intake event occurring after top dead in a manner to vary amount of residual burned gas in the combustion chamber flowing to the intake port in the exhaust stroke and back to the combustion chamber in an intake stroke to change autoignition timing in response to a change in operator demanded engine torque.

19. A method for controlling a four stroke internal combustion engine operating in a homogenous charge compression autoignition mode and having an intake valve at an intake port, an exhaust valve at an exhaust port, and combustion chamber, comprising:

adjusting said exhaust valve relative to said intake valve before said intake valve is opened after top dead center during an intake stroke so as to vary exhaust valve closing time relative to top dead center in a manner to vary amount of residual burned gas in the combustion chamber flowing to the exhaust port in an exhaust stroke and back to the combustion chamber in the intake stroke to change autoignition timing in response to a change in operator demanded engine torque.

20. The method of claim 19 including varying the exhaust valve closing time in a first exhaust event before top dead center and in a second exhaust event occurring after top dead center.

* * * * *